United States Patent [19]

Grant et al.

[11] Patent Number: 4,984,108
[45] Date of Patent: Jan. 8, 1991

[54] APPARATUS FOR TRANSPORTING MAGNETIC TAPE CASSETTES OF DIFFERENT SIZES

[75] Inventors: Frederic F. Grant, Bellflower; John P. Grant, Downey, both of Calif.

[73] Assignee: Datatape Incorporated, Pasadena, Calif.

[21] Appl. No.: 286,403

[22] Filed: Dec. 16, 1988

[51] Int. Cl.$^5$ .................. G11B 15/68; G11B 5/008
[52] U.S. Cl. ..................................... 360/92; 360/94; 414/280; 414/282
[58] Field of Search .................. 360/69, 71, 92, 94; 369/34, 35; 414/280, 282

[56] References Cited

U.S. PATENT DOCUMENTS

| | | | |
|---|---|---|---|
| 2,894,616 | 7/1959 | Young | 414/753 |
| 3,557,977 | 1/1971 | Atwater | 214/16.4 |
| 3,630,391 | 12/1971 | Wilson | 214/1 BB |
| 4,113,119 | 9/1978 | Brown et al. | 214/16.4 |
| 4,614,474 | 9/1986 | Sudo | 414/281 |
| 4,635,150 | 1/1987 | Kato et al. | 360/92 X |
| 4,791,509 | 12/1988 | Rademacher | 360/94 |

FOREIGN PATENT DOCUMENTS

| | | | |
|---|---|---|---|
| 0288165 | 10/1988 | European Pat. Off. | 360/92 |
| 0216154 | 9/1986 | Japan | 360/92 |
| 87/07751 | 12/1987 | PCT Int'l Appl. | 360/92 |

Primary Examiner—Robert S. Tupper
Assistant Examiner—Andrew L. Sniezek
Attorney, Agent, or Firm—William F. Noval

[57] ABSTRACT

In a magnetic tape cassette storage and magnetic tape cassette record/reproduce system, disclosed is an accessor which inserts or extracts a cassette from a storage location or a record/reproduce device. The accessor includes a cassette gripper assembly which handles different sizes of cassettes. Lateral motion of the accessor (a) actuates the gripper assembly to grip and ungrip a cassette and (b) effects locking and unlocking of the gripper assembly. A pair of accessors are mounted on an accessor platform so that one accessor can insert a cassette while the other accessor extracts a cassette, either at the same location (record/reproduce device) or at different locations (storage compartments).

4 Claims, 8 Drawing Sheets

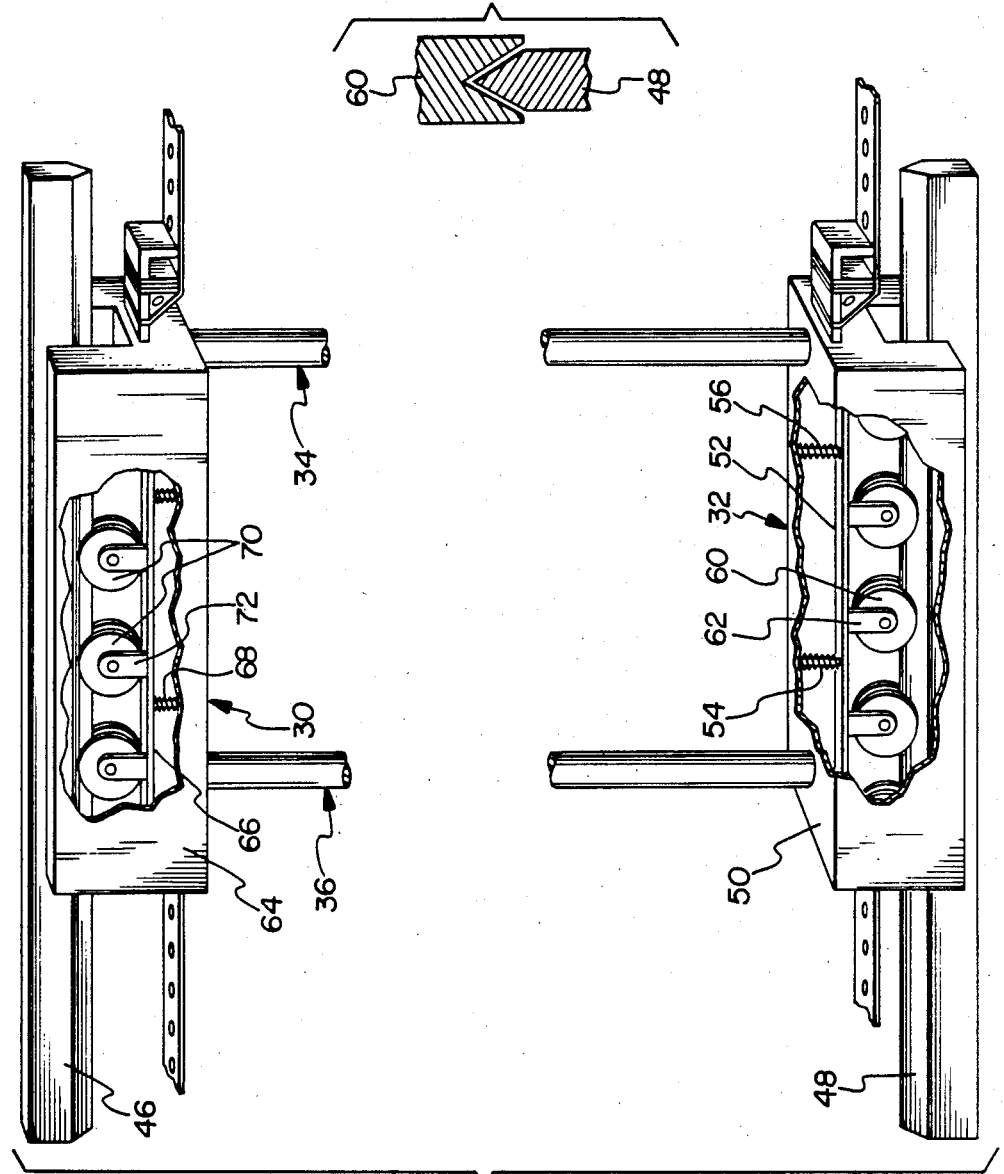

APPARATUS FOR TRANSPORTING MAGNETIC TAPE CASSETTES OF DIFFERENT SIZES

BACKGROUND OF THE INVENTION

This invention relates in general to magnetic tape cassette storage and record/reproduce apparatus, and, more particularly, to a magnetic tape cassette accessor which inserts and extracts cassettes at cassette storage locations and record/reproduce location and grips a cassette for transport between locations.

In applications in which a large amount of information is stored in a plurality of magnetic tape cassettes of different sizes and used in one or more record/reproduce locations, it is desirable that each magnetic tape cassette, be accessed in a minimum amount of time. For example, it is desirable to minimize the time required to change over from one cassette to another cassette used at a magnetic tape record/reproduce device. Where the cassette storage system includes a large number of cassette storage compartments, it is also desirable that the cassette be handled and transported between a storage compartment and a record/reproduce device, in a gentle and reliable manner. Different sizes of cassettes should be accommodated without having to use different cassette handling devices.

Various arrangements have been proposed to transport an object between spaced locations in a storage system. The simplest type of arrangement uses manual power for actuation of the transport system and for loading and loading articles at storage locations. (See: U.S. Pat. No. 4,113,119, issued Sept. 12, 1978, entitled APPARATUS FOR LOADING ARTICLES ONTO VERTICALLY SPACED HORIZONTALLY DISPOSED SHELVES.) Although such an arrangement is relatively inexpensive, it is disadvantageous because it is not readily adaptable for use as an automatic storage and handling system. In order to ameliorate this deficiency in manual transport and handling systems, it has been proposed to use motors in order to actuate the transport assembly. Typically, at least one or more of the actuating motors are mounted on the transport assembly itself. (See, for example, U.S. Pat. No. 3,557,977, issued Jan. 26, 1971, entitled LOAD DETECTING DEVICE FOR WAREHOUSING SYSTEM, and U.S. Pat. No. 4,614,474, issued Sept. 30, 1986, entitled DEVICE FOR EXCHANGING DISKS.) However, drive motors and drive motor supports, add considerable weight to the transport assembly, thus increasing the stresses on the transport assembly drive and on the transport assembly load-bearing components. Moreover, reliability is reduced and maintenance is made more difficult.

Automatically operated, article gripping mechanisms are disclosed in U.S. Pat. No. 3,630,391, issued Dec. 28, 1971, entitled "Work Gripper", and U.S. Pat. No. 2,894,616, issued Jul. 14, 1959, entitled "Automatic Material Handling Mechanism". In both patents, the gripping mechanisms are actuated by pneumatic power sources mounted on the mechanisms. This is disadvantageous due to the weight of the mechanism and the necessity of using moving conduits for the actuating fluid.

SUMMARY OF THE INVENTION

According to the present invention, there is provided a magnetic tape cassette transport/accessor assembly which obviates the disadvantages of the prior art. According to an aspect of the present invention, a magnetic tape cassette accessor and actuator therefor is provided, in which the weight of the accessor is minimized, thus providing gentle and reliable handling and transport of a magnetic tape cassette. The accessor is capable of handling cassettes of different sizes automatically, thus increasing efficiency and minimizing access time.

Preferably the accessor of the present invention, is used in a magnetic tape cassette storage and record/reproduce system, which includes a plurality of magnetic tape cassette storage compartments for different size cassettes and one or more record/reproduce devices. The accessor includes a cassette gripper assembly which is actuated and locked and unlocked through mechanisms actuated by lateral motion of the accessor to insert and extract a cassette at a storage location or at a record/reproduce device.

DESCRIPTION OF THE DRAWINGS

In the detailed description of the preferred embodiments of the invention presented below, reference is made to the accompanying drawings in which like numbers represent like elements.

FIGS. 3A and 3B are perspective and sectional views of components of the apparatus of FIGS. 2A and 2B.

DESCRIPTION OF THE PREFERRED EMBODIMENTS

In the following description of a preferred embodiment of the present invention, it will be described as used with magnetic tape cassette storage and record/reproduce apparatus. It will be understood, however, that the present invention may also be used in any application which requires the accessing and transport of magnetic tape cassettes or cartridges.

As used in this application, the term "accessor" defines an assembly which grips or holds a magnetic tape cassette, (1) while the assembly is moved into or out of a cassette storage location or a cassette loading location of a record/reproduce device, to insert or extract the cassette at the location; and (2) while the assembly is transported between storage and/or loading locations.

Figure 1:
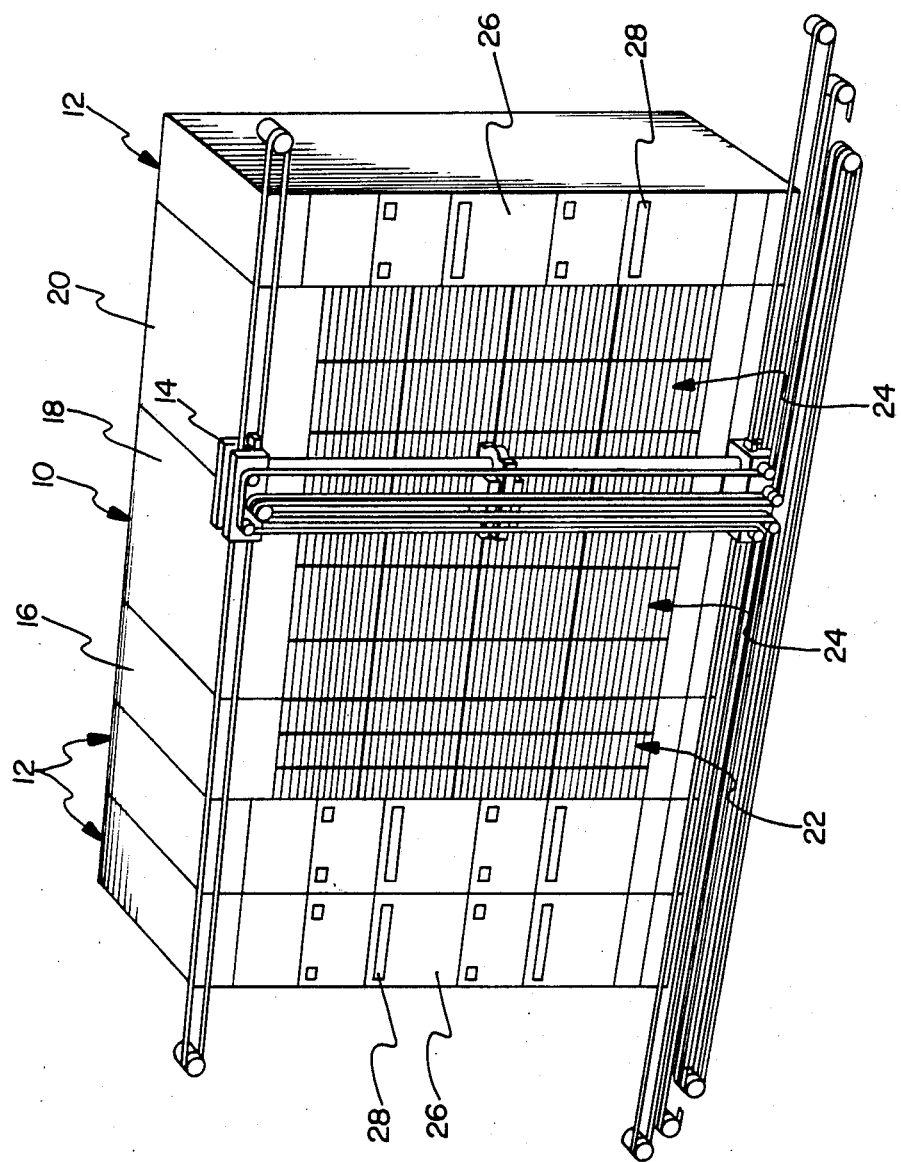
FIG. 1 is a perspective, diagrammatic view of a magnetic tape cassette storage and record/reproduce system incorporating an embodiment of the present invention.

Referring now to FIG. 1, there is shown magnetic tape cassette storage system 10, magnetic tape record/reproduce modules 12 and magnetic tape cassette transport/accessor assembly 14. Cassette storage system 10 includes side-by-side storage modules 16, 18 and 20.

Storage module 16, for example, has a matrix of small cassette storage compartments 22 for storing small magnetic tape cassettes. Storage modules 18 and 20 have a matrix of large cassette storage compartments 24 for storing large magnetic tape cassettes. Each of storage modules 16, 18 and 20 comprise a matrix of columns and rows of cassette storage compartments to store a large number of magnetic tape cassettes of a given size.

Each record/reproduce module 12 includes two magnetic tape record/reproduce devices 26, which include a cassette loading slot 28, through which a magnetic tape cassette is inserted into and extracted from device 26.

Figure 2A:
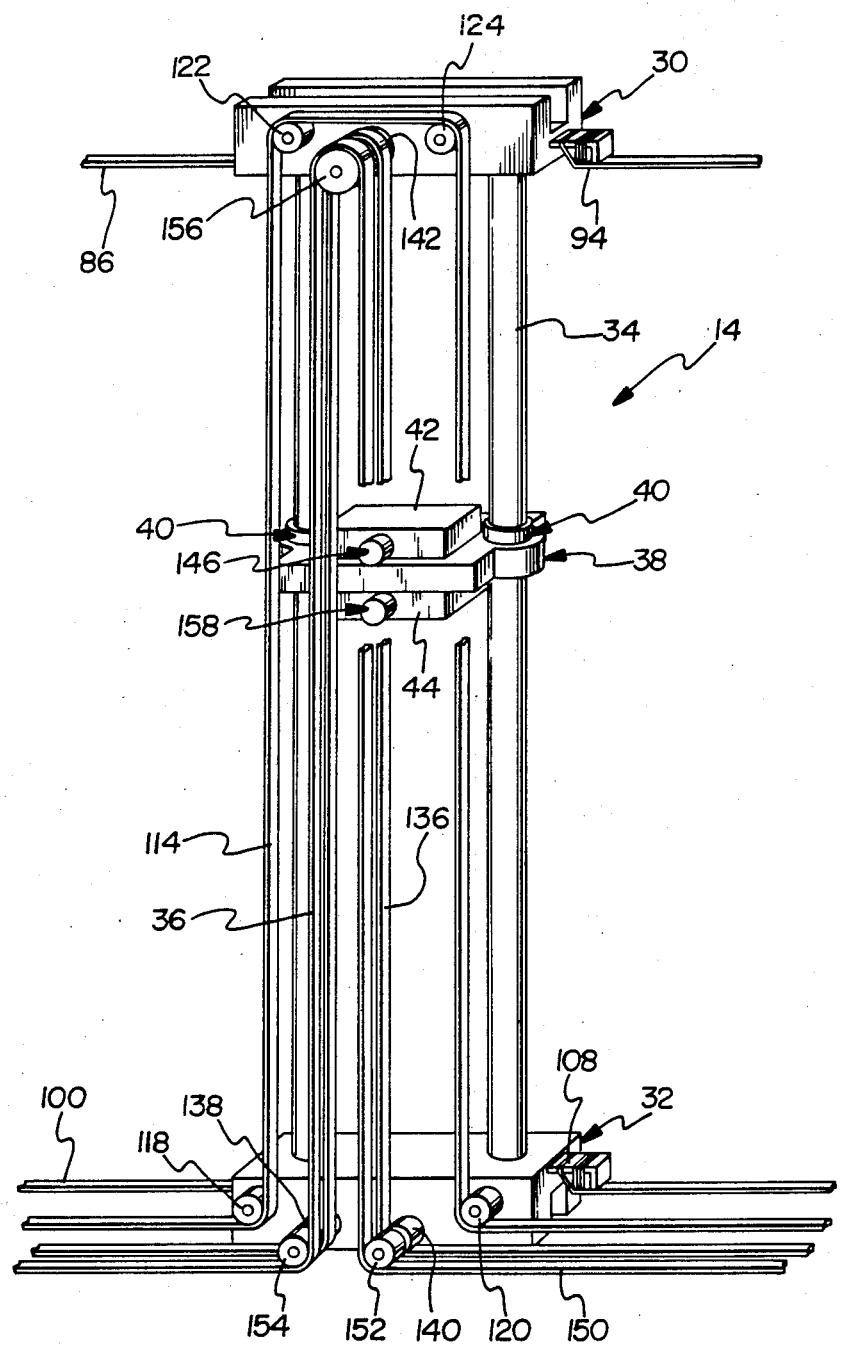
FIGS. 2A and 2B are, respectively, front perspective and diagrammatic views of a cassette transport/accessor assembly including an embodiment of the present invention.

Referring now to FIGS. 2A-4, there will be described in greater detail the cassette transport/accessor assembly 14 including an embodiment of the present invention. As shown in FIG. 2A, cassette transport/accessor assembly 14 includes, upper carriage 30, lower carriage 32, vertical rails 34 and 36, rigidly mounted on carriages 30 and 32, and accessor platform 38, which is mounted for vertical movement on vertical rails 34 and 36 by means of bearings 40. Accessor platform 38 carries two magnetic tape cassette accessors 42 and 44 according to the present invention.

As shown in FIG. 3A, upper carriage 36 travels on V-shaped upper rail 46 and lower carriage 32 travels on V-shaped lower rail 48. Rails 46 and 48 are parallel and are respectively located at the top and bottom of modules 12, 16, 18 and 20. Rails 46 and 48 extend the length of modules 12, 16, 18, 20. Carriage 32 includes a housing 50 mounted on wheel-carrying member 52 by means of springs 54 and 56. Member 52 rotatably mounts a plurality of V-shaped wheels 60 by means of brackets 62. As shown in FIG. 3B, rail 48 and wheels 60 have complementary V shapes.

Upper carriage 30 is similar in construction to lower carriage 32. Carriage 30 includes housing 64 mounted on wheel-carrying member 66 by means of springs 68. Member 66 supports a plurality of V-shaped wheels 70 by means of wheel brackets 72.

Figure 2B:
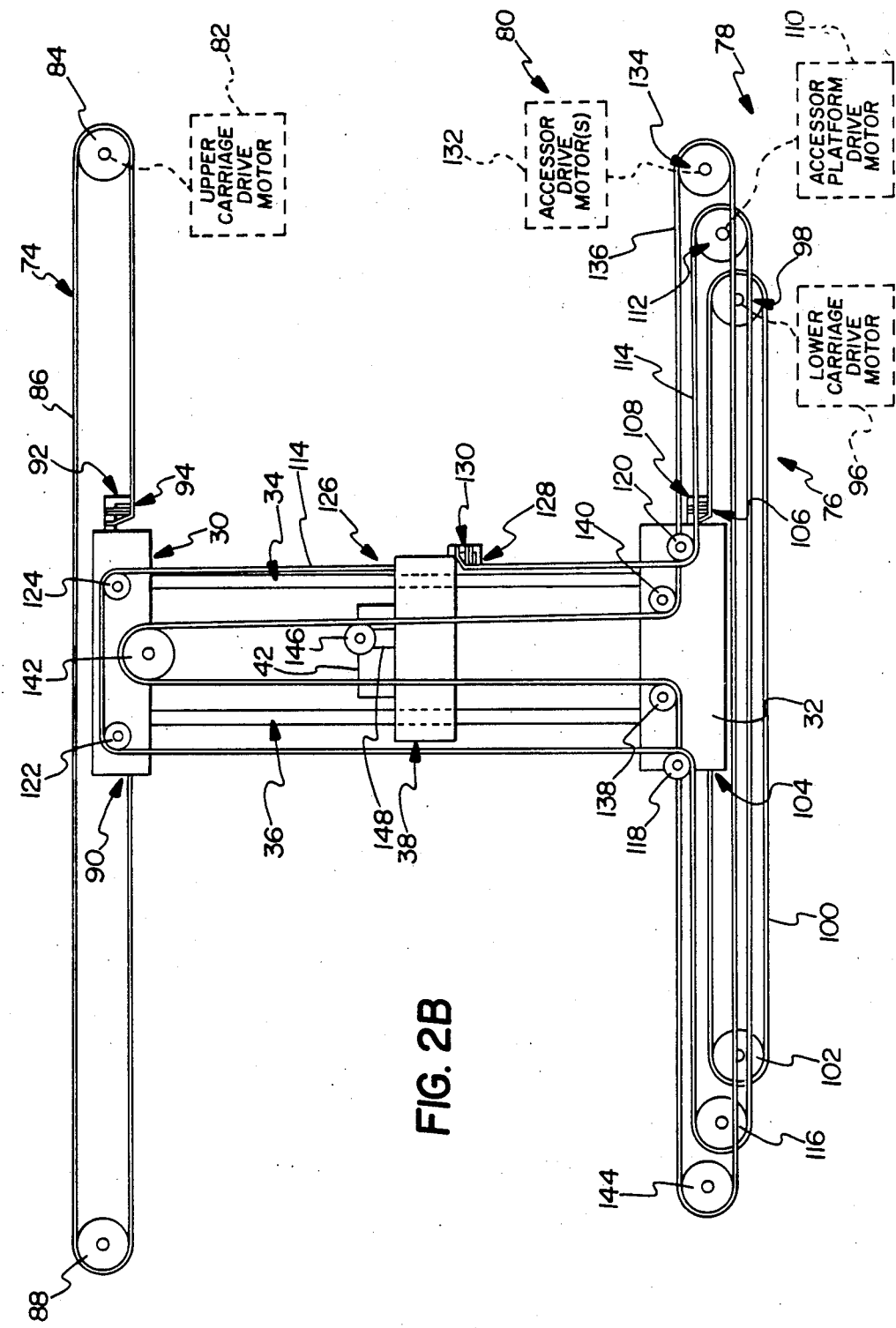

As shown in FIGS. 2A and 2B, there is provided an upper carriage belt drive 74, a lower carriage belt drive 76, accessor platform belt drive 78 and accessor belt drive 80. Upper and lower carriage belt drives 74 and 76 provide horizontal movement to the transport/accessor assembly and cause carriages 30 and 32 to travel along rails 46 and 48, respectively. Drives 74 and 76 are driven synchronously so that the assembly is not subjected to any tilting forces. Accessor platform belt drive 78 drives accessor platform 38 vertically along rails 34 and 36. Accessor belt drive 80 drives the accessor or accessors on accessor platform 38 laterally to insert and extract magnetic tape cassettes from the storage compartments of cassette storage system 10 and from the cassette loading slots of record/reproduce modules 12.

Upper carriage belt drive 74 includes an upper carriage drive motor 82 (FIG. 2A) connected to sprocket 84. Sprocket 84 drives perforated stainless steel belt 86. Belt 86 is trained about sprocket pulley 88 and is fixedly attached at one end 90 to upper carriage 30 and at its other end 92 to carriage 90 by means of spring dampener assembly 94. Lower carriage belt drive 76 includes lower carriage drive motor 96 connected to sprocket 98. Sprocket 98 drives perforated stainless steel belt 100 which is trained around sprocket pulley 102. Belt 100 is fixedly attached to lower carriage 32 at one end 104 and at the other end 106 by means of spring dampener assembly 108.

Accessor platform belt drive 78 includes accessor platform drive motor 110 connected to sprocket 112. Sprocket 112 drives perforated, stainless steel belt 114 which is also trained about sprocket pulley 116. Belt 114 is also trained about sprocket pulleys 118 and 120 mounted on lower carriage 32 and about sprocket pulleys 122 and 124 mounted on upper carriage 30. Belt 114 is fixedly attached at one end 126 to accessor platform 38 and at its other end 128 to accessor platform 38 by means of spring dampener assembly 130.

As shown diagrammatically in FIG. 2B, accessor belt drive 80 includes accessor drive motor 132 which is connected to sprocket 134. Sprocket 134 drives perforated stainless steel belt 136. Belt 136 is trained about sprocket pulleys 138 and 140 rotatably mounted on lower carriage 32, about sprocket pulley 142 rotatably mounted on upper carriage 30 and about sprocket pulley 144. Belt 136 engages a sprocket 146 which is mounted on accessor platform 38 by means of bracket 148.

A second accessor belt drive is provided for driving accessor 44 in a lateral direction. (See: FIG. 2A) The second accessor belt drive includes a perforated stainless steel belt 150 driven by an accessor drive motor (not shown). Belt 150 is trained about sprocket pulleys 152 and 154 rotatably mounted on lower carriage 32 and about sprocket pulley 156 rotatably mounted on upper carriage 30. Belt 150 engages sprocket 158 mounted on accessor platform 38. Belt 150 drives accessor 44 to travel in a lateral direction to insert and extract a magnetic tape cassette. Motors 82, 96, 110 and 132 (and the motor-not shown-which drives belt 150) are preferably brushless direct current motors.

Figure 5:
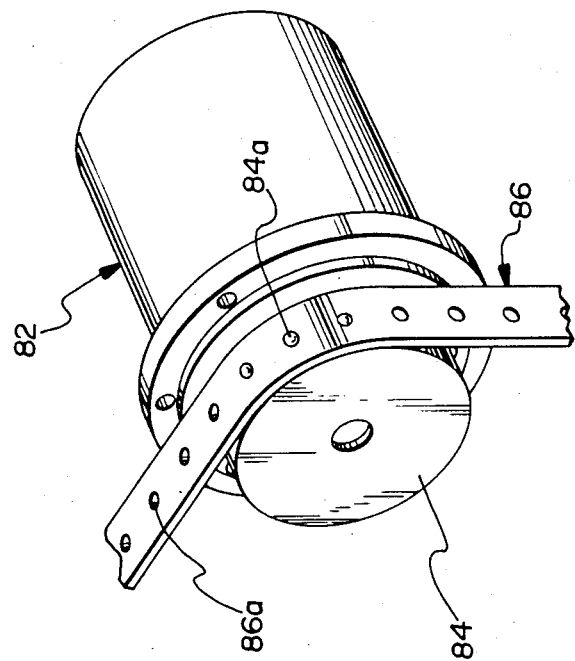
FIG. 5 is a perspective view showing, in detail, a motor-sprocket-belt drive used in the apparatus shown in FIGS. 2A and 2B.

FIG. 5 shows a perspective view of upper carriage drive motor 82 connected to sprocket 84. Belt 86 has perforations (sprocket holes) 86a which are engaged by sprocket teeth 84a of sprocket 84. Drive belts 86, 100, 114, 136 and 150 are high yield, stainless steel belts. The stress in the stainless steel belts to move their respective loads is very low when compared to the strength of the belt material. The belts are installed with low tension in order that the friction force between a drive belt and a sprocket pulley is not sufficient to drive the respective load in acceleration. Thus, the sprocket teeth of the drive sprocket will drive the belt unaided and unopposed by belt friction.

Spring dampener assemblies 94, 106 and 130 provide smooth acceleration and deceleration of the respective assemblies driven by the belts to which they are attached. The spring dampener assemblies also provide compensation for differential thermal expansion and contraction.

Figure 4:
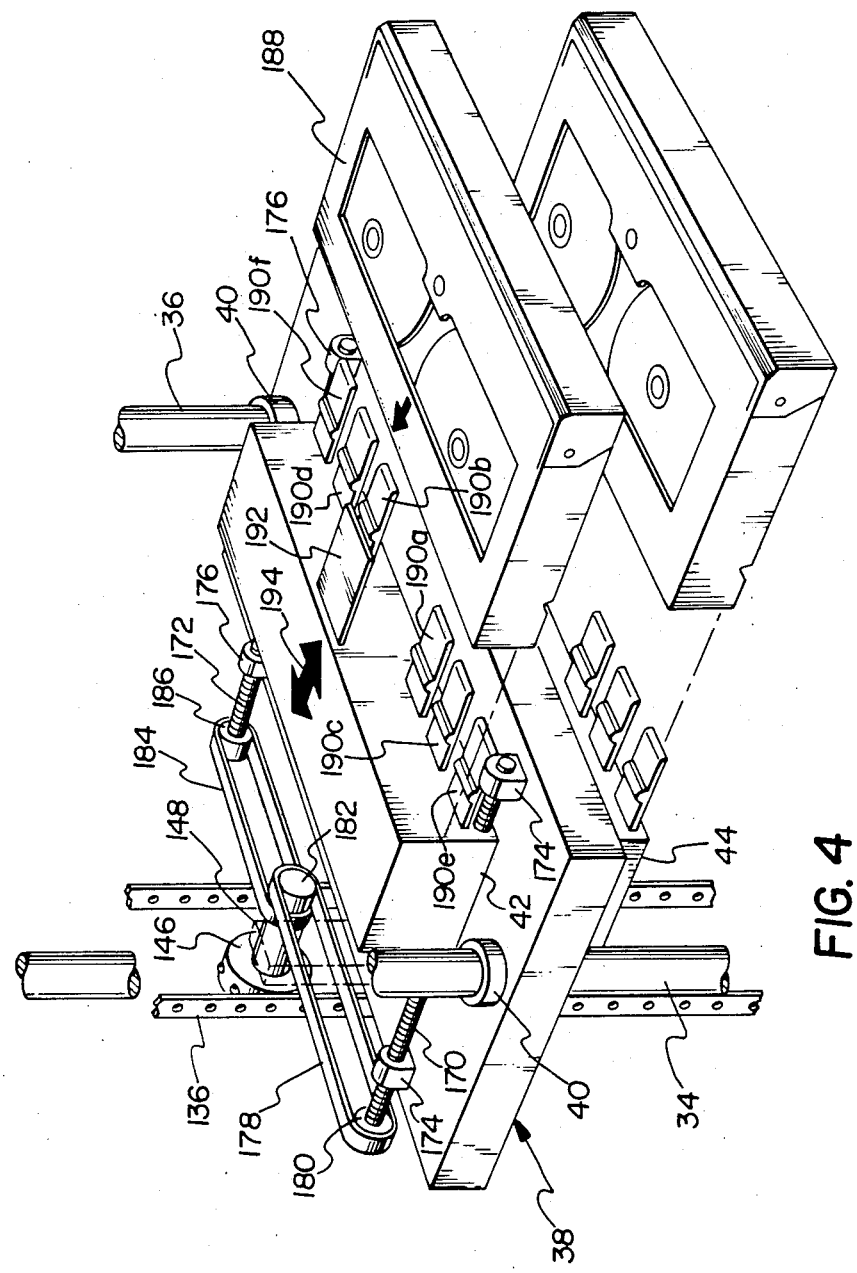
FIG. 4 is a perspective view of an embodiment of the present invention.

Referring now to FIG. 4, there is shown in greater detail, cassette accessor assemblies 42 and 44 according to the present invention. Cassette accessor 42 is mounted for lateral movement on accessor platform 38 by means of lead screws 170 and 172, respectively mounted on platform 38 by means of brackets 174 and 176.

Rotation of sprocket 146 by drive belt 136 rotates screws 170 and 172 by means of belts 178 and 184. Belt 178 is trained about a pulley 180 which is mounted on screw 170, and also about a shaft 182 upon which sprocket 146 is mounted. Belt 184 is trained about a pulley 186 which is mounted on screw 172 and also about shaft 182.

Accessor 44 is driven in a lateral direction by a similar screw assembly (not shown).

Accessor 42 has a cassette gripper mechanism which includes an upper finger 192 and three pairs of lower fingers 190a–190b, 190c–190d, 1903–190f for gripping small, medium and large cassettes 188, respectively. Lower fingers 190c–190d and 190e–190f are retractable and spring biased and are at progressively higher elevations than lower fingers 190a–190b. Thus, fingers 190a–190b are at the lowest elevation, and grip a small cassette, as fingers 190c–190d and 190e–190f are retracted against the lips of adjacent cassette compartments. Fingers 190c–190d are at a slightly higher elevation than fingers 190a–190b and fingers 190e–190f are at a still higher elevation than either fingers 190a–190b or fingers 190c–190d. Thus, the cassette is supported at its outer edges by the appropriate lower finger pair.

Referring now to FIGS. 6A–6C and 7A–7E, there will be described in greater detail the structure and operation of the gripper mechanism of the embodiment of the accessor shown in FIG. 4. As shown, upper finger 192 is rotatably mounted on bracket(s) 194 and is normally biased open by spring 196. Upright member 198 has a spring 200 located in recess 202 and is adapted to engage a (large) cassette 188 located in a storage compartment 24 of a cassette storage module 18 (20). Finger 190f (190e) has a beveled tip 204 for ease of insertion under cassette 188. Ridge 206 on the upper surface of finger 190f, fits into groove 208 in the lower surface of cassette 188 to effect precise positioning of cassette 188 within the grip of fingers 190, 192 and to provide a positive grip to withstand the forces of acceleration and deceleration of transport/accessor assembly 14.

Figure 6A:
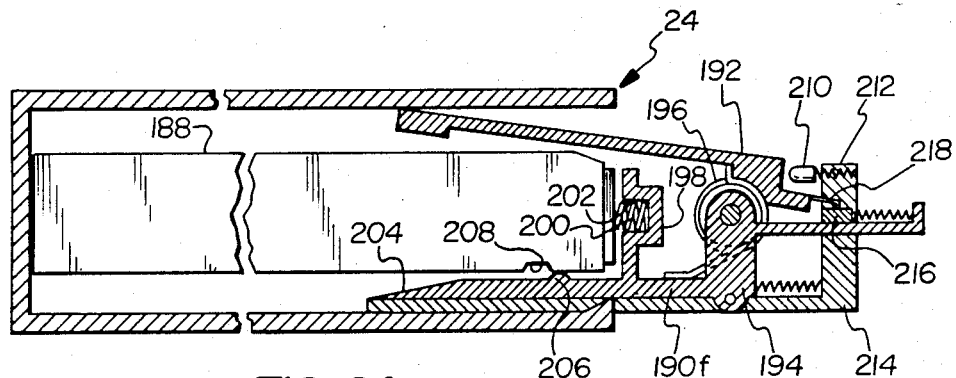
FIGS. 6A–6C are diagrammatic, elevational views illustrating operation of the gripper mechanism of the embodiment of the invention of FIG. 4.
Figure 6B:
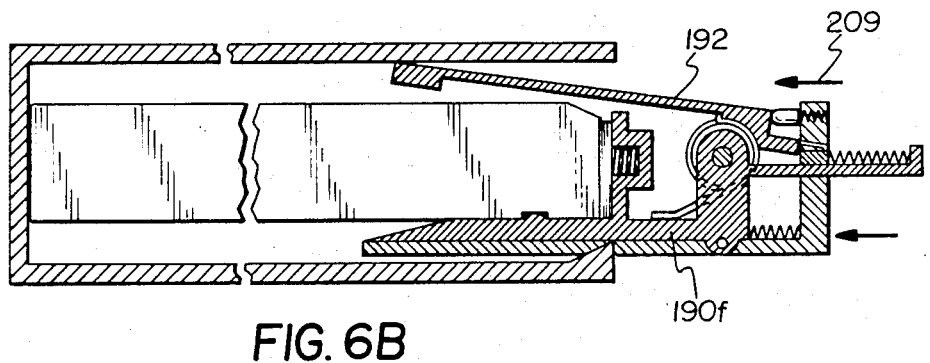
Figure 6C:
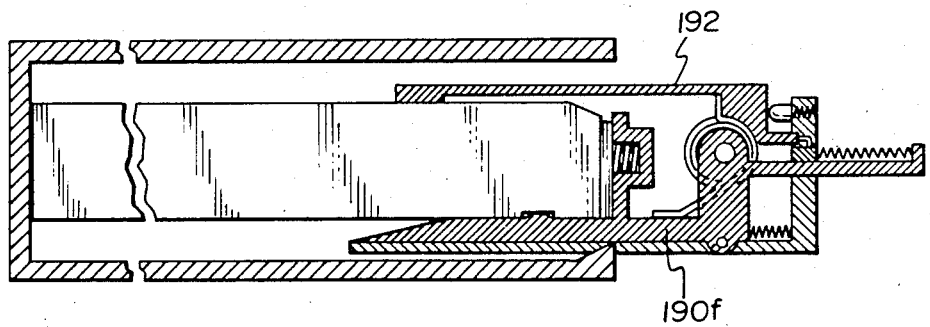

As accessor 42 is moved laterally (arrow 209, FIG. 6B) to grip a cassette 188 by means of fingers 190 and 192, finger 192 is rotated to close onto cassette 188 by means of pin 210. Pin 210 is biased by spring 212 secured to accessor member 214 (FIGS. 6A–6C). The gripper finger assembly 190, 192 slides with respect to member 214 to effect rotation of finger 192.

Figure 7A:
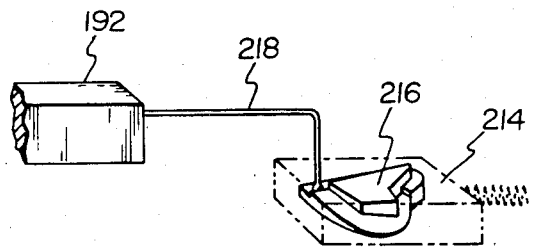
FIGS. 7A–7E are diagrammatic, perspective views illustrating operation of the locking mechanism of the embodiment of the invention of FIG. 4.
Figure 7B:
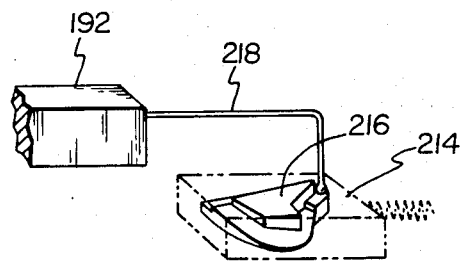
Figure 7C:
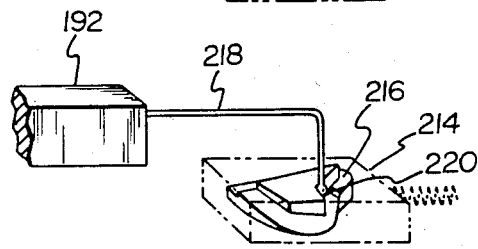
Figure 7D:
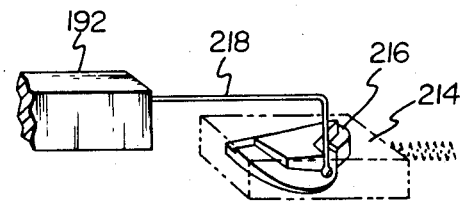
Figure 7E:
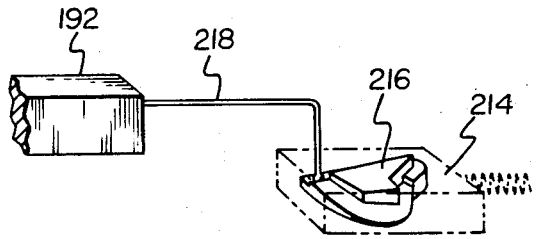

A mechanism for locking finger 192 includes cam 216 mounted on member 214 and cam follower 218 mounted on finger 192. Operation of this locking mechanism is illustrated with reference to FIGS. 7A–7E. In FIG. 7A, finger 192 is open and unlocked and cam follower 218 engages the front surface of cam 216. (See FIG. 6A). In FIG. 7B, finger 192 is closed, since member 214 has moved forward relative to finger 192 causing cam follower 216 to follow to the rear surface of cam 216. In FIG. 7C, the gripping mechanism is locked, cam follower 218 bearing against locking face 220 of cam 216. By moving member 214 forward relative to finger 192, cam follower 218 disengages from face 220 of cam 216 (FIG. 7D). Cam follower 218 then moves forward to the front of cam 216 as member 214 moves rearwardly with respect to finger 192. Finger 192 is unlocked and opens to release its grip on cassette 188.

The cassette transport/accessor assembly 14 physically transports any size magnetic tape cassette between any cassette storage compartment 22 or 24 in cassette storage system 10, and any other storage compartment in system 10 or a cassette loading slot of any record/reproduce device 26 in modules 12. In actuating the upper and lower carriage drive motors 82 and 96, accessor platform drive motor 110, and accessor motor 132 the accessor platform may be moved horizontally, vertically, or diagonally to position the accessor platform at any location for inserting or extracting a magnetic tape cassette. After the accessor platform 38 has been properly positioned, accessor drive motor 132 is actuated to move the accessor 42 (or 44) laterally to extract or insert a magnetic tape cassette. By providing two accessors 42 and 44 on accessor platform 38, one accessor may be used to extract a cassette from a record/reproduce device, while the other accessor inserts the next magnetic tape cassette to be used by the record/reproduce device. Thus, cassette exchange is effected in a minimum amount of time. During the time that a magnetic tape cassette is being loaded, threaded and played (or recorded) in a magnetic tape record/reproduce device, the transport/accessor assembly 14 travel to deposit the last used magnetic tape cassette in its storage compartment and to access another magnetic tape cassette to be used by a record/reproduce unit.

The invention has been described above in detail with respect to preferred embodiments thereof, but it will be understood that variations and modifications can be effected within the spirit and scope of the invention.

What is claimed is:

1. Apparatus for transporting a magnetic tape cassette, comprising:

upper and lower finger means for gripping a cassette, said upper finger means being mounted relative to said lower finger means for rotation between open and closed positions;

means for supporting said upper and lower finger means for reciprocal movement relative to a stationary cassette, wherein said upper and lower finger means and said supporting means are movable relative to each other;

means for moving said supporting means between a position spaced from a stationary cassette at which said upper finger means is in said open position and each of said upper and lower finger means being spaced from said cassette and a position at which said lower finger means engage said cassette and said upper finger means is rotated to said closed position to grip said cassette;

locking means, actuated by movement of said supporting means, for locking said upper finger means in said closed position to prevent release of said cassette by said upper and lower finger means; and wherein said lower finger means includes a first set of lower fingers for gripping a cassette of a first width and a second set of lower fingers for gripping a cassette of a second width greater than said first cassette width, said second set of fingers being located outwardly of above said first set of fingers with respect to said upper finger means.

2. The apparatus of claim 1 wherein said locking means includes a cam mounted on said supporting means and a cam follower mounted on said upper finger means.

3. The apparatus of claim 1 wherein said second set of lower fingers is retractable when said first set of lower fingers, grips a cassette of said first width.

4. The apparatus of claim 1 wherein said lower finger means have beveled front edges for easy insertion under said cassette.

* * * * *